United States Patent [19]
Kruse

[11] Patent Number: 6,136,590
[45] Date of Patent: Oct. 24, 2000

[54] WASTE MATERIALS RECYCLING METHOD AND APPARATUS

[76] Inventor: Robert A. Kruse, 4300 Baker Rd., Minnetonka, Minn. 55343

[21] Appl. No.: 09/112,391

[22] Filed: Jul. 9, 1998

Related U.S. Application Data

[60] Provisional application No. 60/075,964, Feb. 24, 1998.

[51] Int. Cl.$^7$ .................. C05D 9/04; C05D 9/02
[52] U.S. Cl. .............. 435/262; 435/290.4; 71/8; 71/14; 209/930; 241/DIG. 38
[58] Field of Search .............. 435/290.1–290.4, 435/262, 262.5; 71/8–10, 14, 64.13; 209/930; 241/DIG. 38, 31, 24.12–25, 30, 101.2, 301; 100/35, 903; 264/109; 428/2

[56] References Cited

U.S. PATENT DOCUMENTS

| | | |
|---|---|---|
| 3,579,320 | 5/1971 | Pesses . |
| 3,736,111 | 5/1973 | Gardner et al. . |
| 3,790,091 | 2/1974 | Law et al. . |
| 4,098,464 | 7/1978 | Niedner et al. . |
| 4,264,352 | 4/1981 | Houser . |
| 4,341,353 | 7/1982 | Hamilton et al. . |
| 4,586,659 | 5/1986 | Easter, II . |
| 4,610,396 | 9/1986 | Carbonell Serra et al. . |
| 4,859,211 | 8/1989 | Moore . |
| 5,024,770 | 6/1991 | Boyd et al. . |
| 5,101,977 | 4/1992 | Roman . |
| 5,184,780 | 2/1993 | Wiens . |
| 5,250,100 | 10/1993 | Armbristor . |
| 5,352,469 | 10/1994 | Peters . |
| 5,361,994 | 11/1994 | Holloway . |
| 5,441,552 | 8/1995 | DeLillo . |
| 5,465,847 | 11/1995 | Gilmore . |
| 5,570,517 | 11/1996 | Luker . |
| 5,649,785 | 7/1997 | Djerf et al. . |
| 5,678,773 | 10/1997 | Takamura et al. . |

FOREIGN PATENT DOCUMENTS 2 164 331   3/1986   United Kingdom .

Primary Examiner—William H. Beisner
Attorney, Agent, or Firm—Burd, Bartz & Gutenkauf

[57] ABSTRACT

A waste material separating method and apparatus a number of sequential processes the separate paper, plastic, glass, wood, and metals from waste materials. Bulk materials are manually removed from conveyors. Screening machines separate fine from course materials. Fine organic materials are transported to a composting area or to a digester to generate gas used fuel to produce thermal energy. A shredder cuts the course materials which mixed and pressed into pellets.

30 Claims, 6 Drawing Sheets

WASTE MATERIALS RECYCLING METHOD AND APPARATUS

CROSS REFERENCE TO RELATED APPLICATION

This application claims the benefit of U.S. Provisional Patent Application Ser. No. 60/075,964 filed Feb. 24, 1998.

FIELD OF THE INVENTION

The invention is in the field of solid waste material processing and recycling methods and apparatus including curing of the materials into useable compost.

BACKGROUND OF THE INVENTION

Commercial industrial and residential consumers daily generate a large amount of throw-away and waste products which must be handle and disposed of in an environmental satisfactory manner. Landfills in remote land cites are used to accommodate waste products. The waste products in landfills are either incinerated ash or directly buried in soil. These methods of waste product disposed contaminate the soil and water. Recovery of useable materials from landfills is labor and time intensive and in most cases not yet economically feasible. Waste recycling systems have been designed to recover waste products for further use. Paper, glass, metal and plastics are manually separated in homes and commercial establishments and collected for recycling purposes. All of the waste products are not recovered in this selective processing and recycling system. Central incinerator plants are used to burn raw waste products and produce steam used to generate eclectic power and heat buildings. Emissions from incinerator plants affect air quality in the environment down wind the plant. Waste recycling plants having material sorting and recovery features are designed to recover aluminum, plastic and cardboard and compost and compress into pellets the remaining materials. The pellets are used as fuel in furnaces. The waste materials recycling method and apparatus is a new and novel improvement of the prior waste recycling plants that has substantial technical merit.

SUMMARY OF THE INVENTION

The waste material processing apparatus of the invention has a number of waste processing machines integrated into a system that recovers resource materials from the waste for subsequent use in an environmental responsible manner. The resource materials are refuse and wastes collected from residential, retail, industrial and commercial sources. The waste includes soil, particulates, wood, cardboard, fabrics, metals, leathers, glass, paper, plastics, kitchen, restaurant, tavern and public eating house wastes and containers.

The materials processing apparatus has a hopper for receiving a mixture of materials which were deposited in a tipping area. A conveyor moves the materials from the hopper to a first sorting table where workers pick out and segregate selected bulk materials, such as cardboard and wood. These materials are compacted into bales or shredded without further processing. The remainder of the materials are delivered to a trommel screen that separates fine materials from course materials. The fine materials are moved to a mixer after metals and glass have been extracted. The mixed fine materials are transferred to a composting site via conveyors, trucks, trailers or railcars. In an alternative processing of the fine materials moved by a conveyor from a screen, the fine materials are blended with water in a mixer to provide a generally uniform composition of materials. The blend of materials are deposited in a digester where they are subject to an accelerated anaerobic composting process which produces methane gas fuel and useable compost. The gases are removed from the digester and used to produce thermal and mechanical energy. Alternatively, this fuel is the energy source for internal combustion engines which operate generators to produce electric power. The bulk materials from the digester are placed in a curing structure for composting with air and water. The compost from the curing structure is screened to remove tramp and oversized materials. The compost is then packaged as useable composting materials.

The course materials from the trommel screen are delivered to a second sorting table having an endless moving belt for carrying materials. A number of workers pick out and segregate selected materials, such as plastics, glass, fabrics, leather, film plastics and non-ferrous metals and deposit these materials in bins prior to shipment to users. Ferrous and additional non-ferrous metals are removed with separators before the remaining bulk material is transferred to a shredder. The shredder is confined to an enclosure or separate building to protect the waste processing environment from the noise, dust, dirt, and possible fire and explosion hazards during the shredding process. The shredder reduces the particle sizes of the materials which are then transferred with a blower or conveyor to a mixer or storage area. A pelletizer receives the mixed material from the mixer or storage area and compresses the material into pellets. The pellets are transferred to a holding bin or directly to a transport vehicle for shipment to a utilizer, such as a power or heating plant.

DESCRIPTION OF THE PREFERRED EMBODIMENTS OF THE INVENTION

Figure 1:
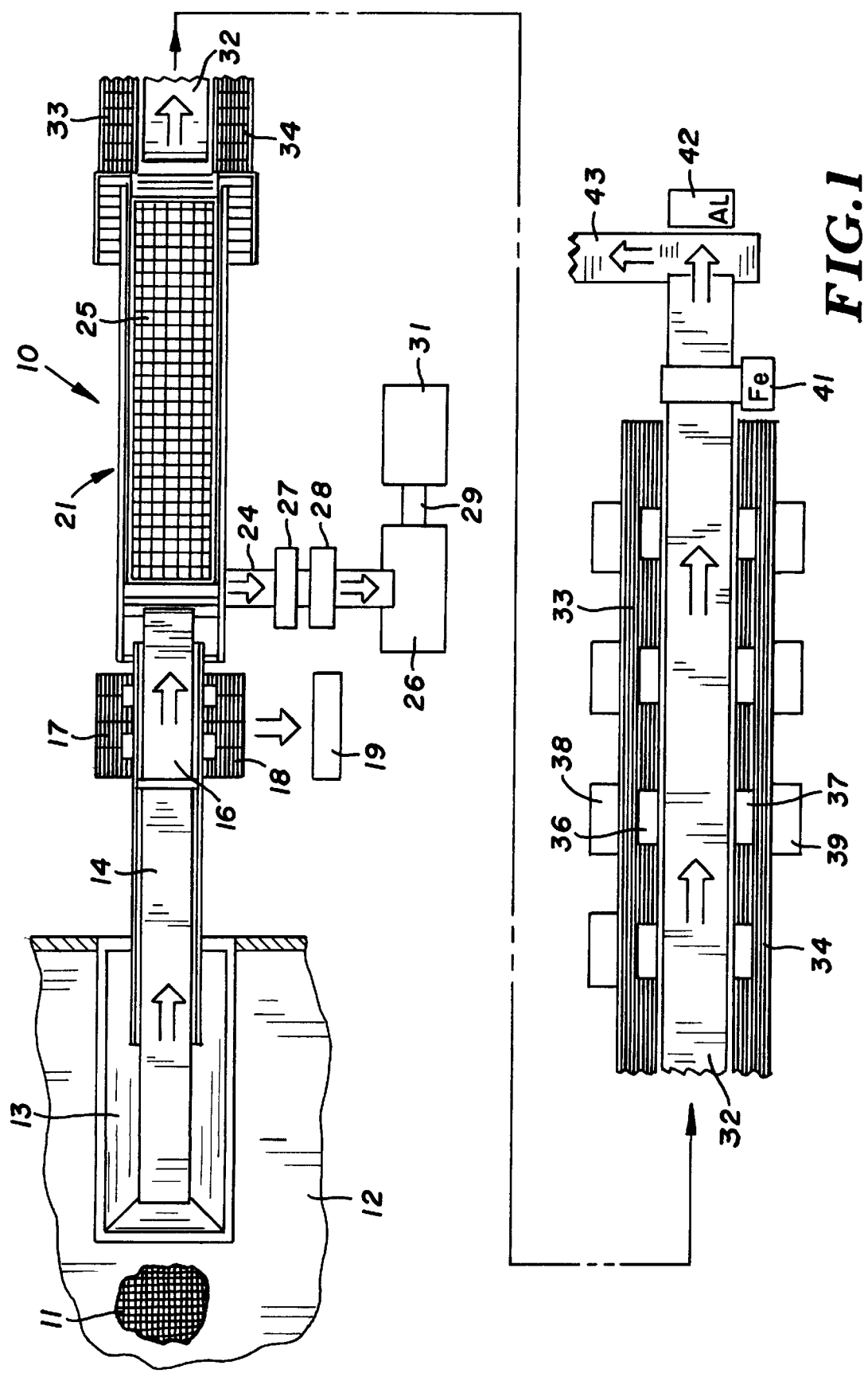
FIG. 1 is a fragmentary top plan view of the unloading, screening and separating sections of the waste materials recycling apparatus of the invention.

The waste recycling apparatus, indicated generally at 10 in FIG. 1, processes inorganic materials and dry and wet organic waste collected from households, retail, and commercial sources. The waste includes, paper, cardboard, plastics, ferrous and non-ferrous metal items, such as cans, pots, pans, glass, and foreign materials, leather, dirt, garbage, foods, and at times hazardous materials. Hazardous materials are promptly removed from the waste and secured in a safe area or container for pick-up by licensed handlers of hazardous materials. The recycling apparatus 10 recovers resource materials by separating selected materials, such as wood, cardboard, fabrics, plastics, metals, glass and combustible materials, so that they can be sold and reused. The organic materials can be converted into useable compost or pelletized into wafers used as fuel.

Figure 3:
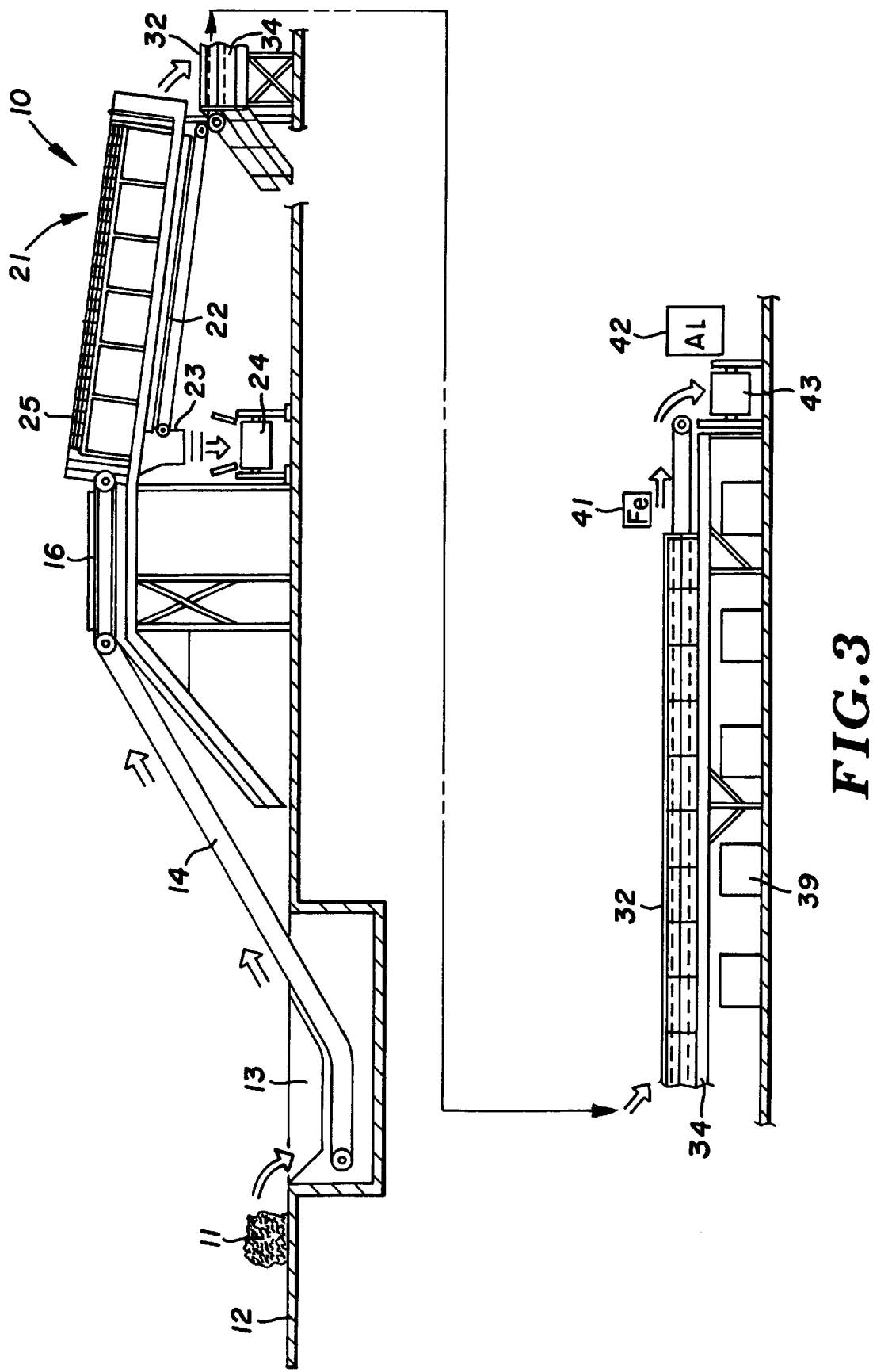
FIG. 3 is a fragmentary side elevational view of the unloading, screening, and separating sections of the apparatus shown in FIG. 1.
Figure 4:
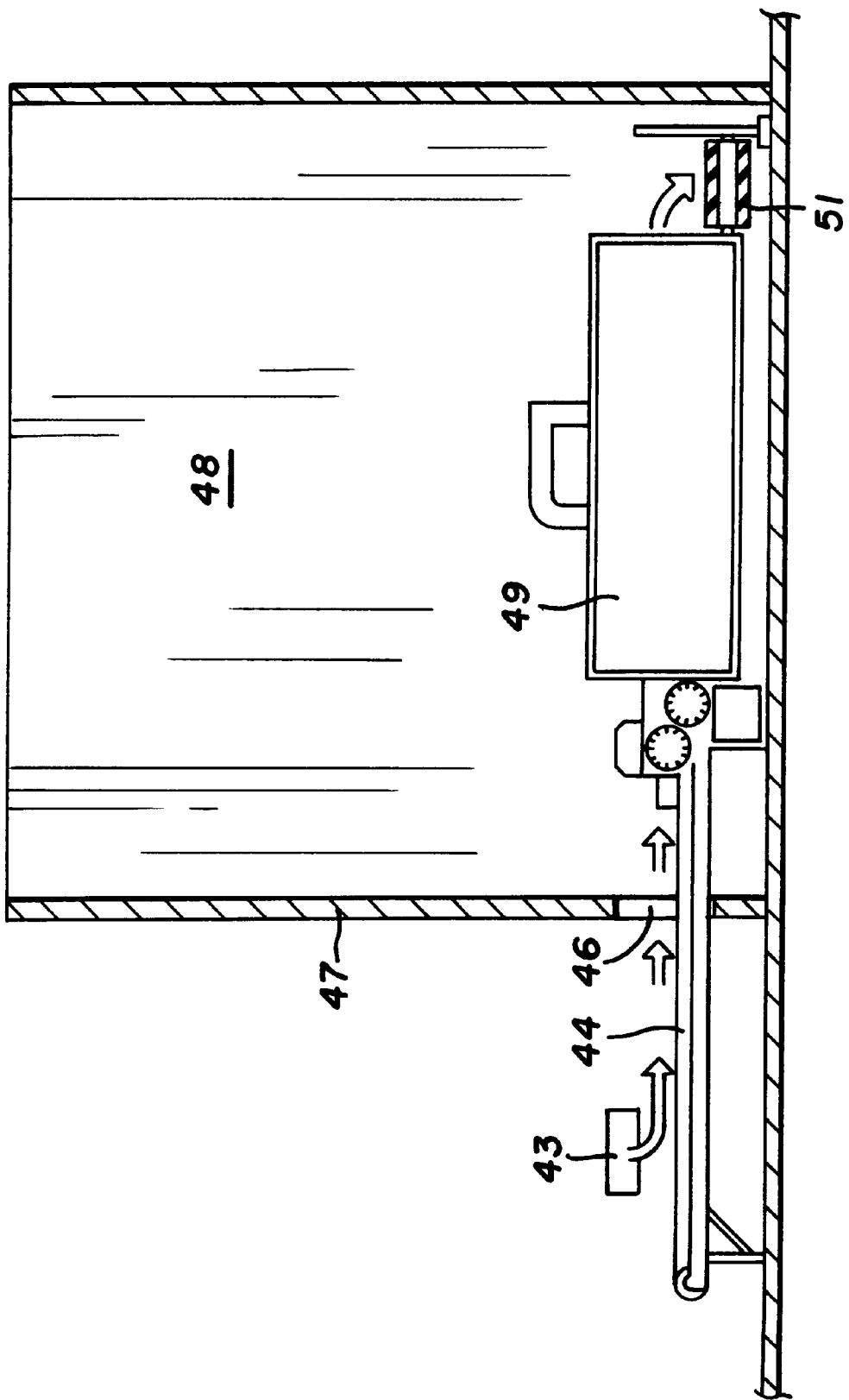
FIG. 4 is a sectional view taken along line 4—4 of FIG. 2.

As shown in FIGS. 1 and 3, the waste or refuse materials 11 is delivered to an enclosed tipping area 12 in collection vehicles and dumped onto the tipping floor. The waste materials are inspected for hazardous materials and materials that cannot be processed. Non-processable and hazardous materials are removed and disposed of in an environmentally responsible manner. A front-end loading vehicle, such as a skid steer tractor, transports the waste materials to a hopper 13 which directs the waste to an inclined conveyor 14. The waste materials are transported upwardly by conveyor 14 to the input end of a horizontal conveyor 16, such as a belt conveyor. Platforms 17 and 18 located adjacent opposite sides of conveyor 16 provide supports for persons that remove bulk materials, such as cardboard, from the waste. The bulk materials are moved to a compactor 19 used to compress and bale these materials. The remaining waste materials are deposited into a trommel screen 21. Screen 21 has an elongated inclined cylindrical screen drum 25 that rotates about its inclined longitudinal axis. The mesh of the screen drum 25 is between three to six inches. Hydraulic or electric motors drive drum 25 to separate solid waste, demolition debris, and like bulk materials from fine materials, such as dirt, sand and organic matter. Several screens located in series can be used to selectively separate fine materials from the bulk waste materials. An inclined belt conveyor 22 located below screen drum 25 collects the fine materials that fall through the drum and moves these materials to a chute 23. The materials fall from chute 23 onto a conveyor 24.

The fine materials are moved by conveyor 22 located below the drum 25 of trommel screen 21 to discharge chute 23 located above transverse conveyor 24. Conveyor 24 transports the fine materials to a mixer 26. Metal separators 27 and 28 extended across conveyor 24 remove ferrous and non-ferrous metals from the fine materials carried by conveyor 24. A conveyor 29 moves the material from mixer 26 to a vehicle load-out equipment 31. The fine materials are delivered to a composting area. The fine materials consist mostly of wet organic material. The organic material can be composted or digested. The composting time and effectiveness can be increased by shredding the organic material and mixing it with water prior to transfer to a composting bed. Wood shavings or blocks can be mixed into the organic material to facilitate composting of the material.

The course material is discharged from trommel screen 21 onto a horizontal moving conveyor belt 32, identified as a sorting table. As shown in FIGS. 1 and 3, worker supports or catwalks 33 and 34 extend along opposite sides of belt 32. Supports 24 and 26 have a number of openings 36 and 37 above bins 38 and 39 for collecting materials hand picked from belt 32. Bulk materials, such as paper, wood and plastic, are picked off belt 32 and placed in bins 38 and 39. A number of persons on supports hand remove specific recyclable materials, as plastic, paper, glass, and metal. The materials in bins 29 and 31 are subsequently pressed into bales which are easily stacked and handled to facilitate transport and marketing.

A magnetic separator 41 located adjacent to exit end of belt 32 operates to remove ferrous materials, such as scrap iron which is placed in large containers and sold without requiring any additional processing. The non-ferrous metals, such as aluminum, are removed from the end of belt 32 with an eddy current separator 42.

Figure 2:
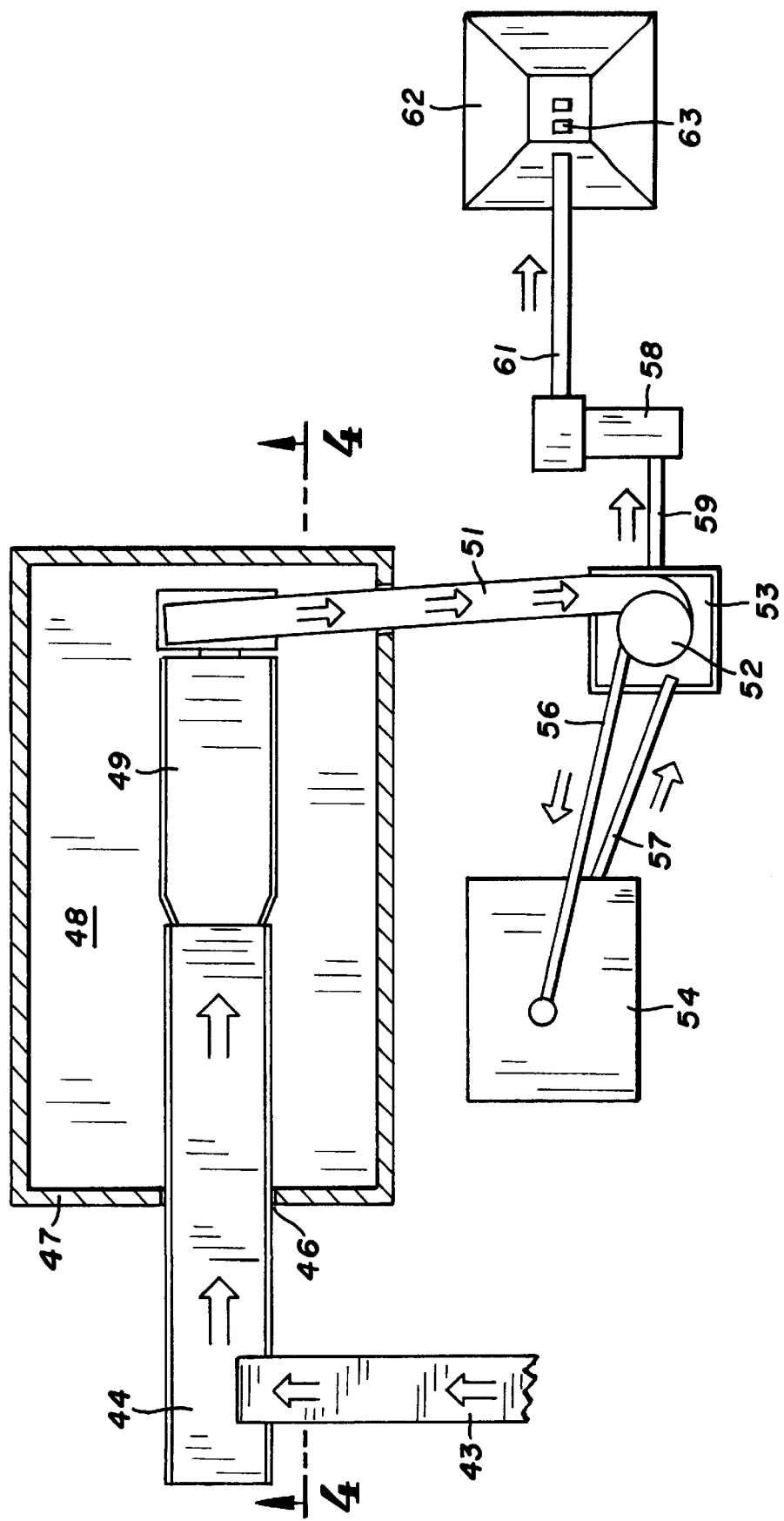
FIG. 2 is a top plan view of the shredding, pelletizing and material storage sections of the apparatus of FIG. 1.

As shown in FIG. 2, a cross conveyor 43 receives the remaining materials from belt 32 and transports these materials to a shredder feed conveyor 44. Conveyor 44 extends through an opening 46 in wall 47. Wall or blast proof enclosure 47 is a continuous generally rectangular upright solid barrier creating a room or enclosure 48. A shredder 49 located in enclosure 48 receives the material discharged by conveyor 44 and cuts up the materials for size reduction. An example of a materials grinder is disclosed by J. H. Page in U.S. Pat. No. 5,344,088. The dust and dirt generated in the shredding process is confined to enclosure 48. Wastes and dust that may ignite or explode during the shredding process are also confined to enclosure 48. A dust collection apparatus can be used to collect and dispose of the dust in enclosure 48.

Material moving apparatus 51, shown as a conveyor, collects the cut-up waste materials discharged by shredder 49 and transport the materials to a cyclone separator 52 operable to remove dust, and small particulates from the materials and air, and consolidate dust and particles. Material moving apparatus 51 can be a motor driven blower located in enclosure 48 adjacent the material discharge end of shredder 49. The material discharged by shredder may be moved into a dryer to remove excess moisture from the materials. Rotary dryer systems are effective to dehydrate the materials with heat and air. A tubular member or pipe transports the material from the blower to cyclone separator 52 operable to separate air, dust and particulates from solid materials. Solid materials are directed to a mixer 53 that also receives consolidated dust and particulates from a dust collector 54. Water can be introduced into mixer 53 to coagulate the small particles and dust. A tube 56 transports air, dust, dirt, and particulates from cyclone separator 52 to dust collector 54. A screw conveyor 57 transports the collected dust, dirt, and particulates from collector 54 to mixer 53.

Figure 5:
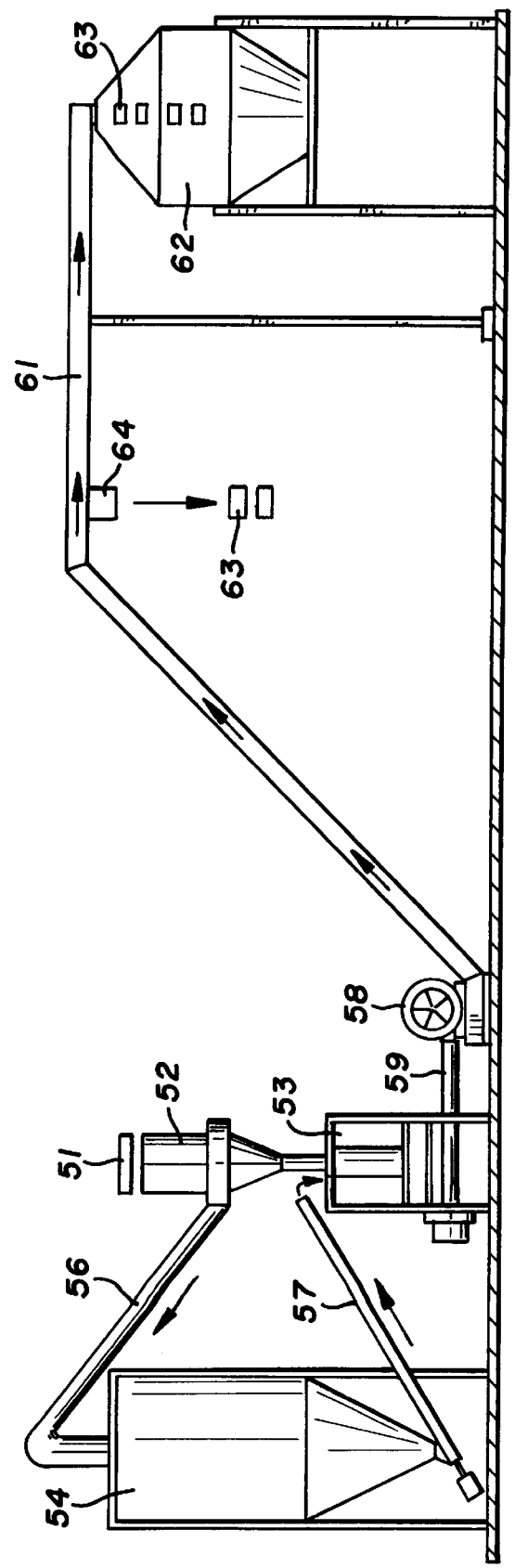
FIG. 5 is a front elevational view of the pelletizing and storage sections of the apparatus of FIG. 1.

As shown in FIGS. 2 and 5, a pelletizer 58 receives the mixed materials from mixer 33 by means of a screw conveyor 59 and compresses the material into rigid and compact pellets. A drag conveyor 61 moves the pellets to a bin or hopper 62. The pellets 63 in hopper 62 can be discharged into a trailer or truck box for transport to a solid fuel utilizer, such as an electric power or heating plant. Conveyor 61 has a pellet discharge spout 64 used to discharge pellets directly into a trailer, truck or rail car box.

Figure 6:
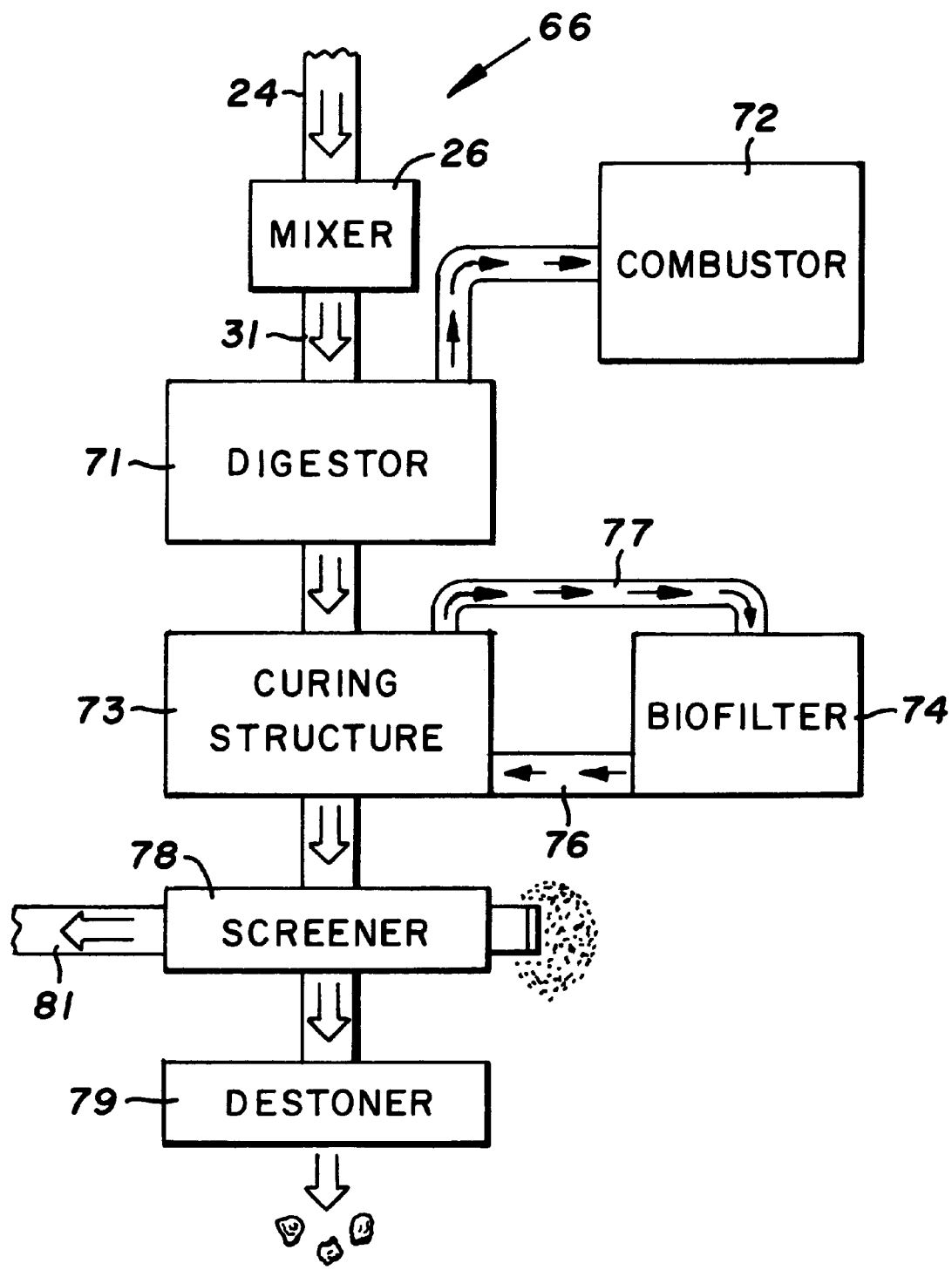
FIG. 6 is a diagrammatic view of the waste material composting system useable in addition to the pelletizing process shown in FIGS. 2 and 5.

A waste material digesting and composting system, indicated generally at 66 in FIG. 6, receives the materials from mixer 26 and converts the material to useable compost and a small amount of landfill material. Composting system 66 replaces truck load-out 31 and composting area. Mixer 26 is a rotating drum mixer operable to create a nearly uniform feed stock with about a 60 percent moisture content. Water is added to the materials being blended in mixer 26 to provide to the materials with the appropriate moisture content.

Mixer 69 discharges the moist blended materials to a digester 71 comprising one or more enclosed structures or vessels, such as metal or concrete tanks. Water is added to the materials in the vessels to sustain the accelerated anaerobic digestive process. Methane and carbon dioxide gases that are produced are collected, cleaned, and utilized as fuel in a combustor 72, such as a boiler to produce steam or hot water, or in an internal combustion or turbine engines.

Combustor 72 has a heated bed of sand-like material suspended within a rising column of air to burn many types and classes of fuel. This technique results in a vast improvement in combustion efficiency of high moisture content fuels, and is adaptable to a variety of "waste" type fuels. The scrubbing action of the bed material on the fuel particle enhances the combustion process by stripping away the carbon dioxide and char layers that normally form around the fuel particle. This allows oxygen to reach the combustible material much more readily and increases the rate and efficiency of the combustion process.

The combustion process achieves uniform bed draw down, integrated air cooling and automatic cleaning and re-injection of the bed material. This feature enables the system to operate on fuels with significant quantities of 10 cm minus non combustible tramp material, such as rocks and metal as opposed to grate style systems, where tramp material and ash slag can cause significant problems requiring a shutdown to correct. Tramp material can build to the point that fluidization is no longer possible allowing clinkers to form. In those systems, a shutdown is usually also required to clean out the accumulation.

The turbulence in the combustor vapor space combined with the simultaneous scouring effect and thermal inertia of the bed material provide for complete, controlled and uniform combustion. These factors maximizing thermal efficiency, minimizing char, and controlling emissions. The high efficiency of a fluid bed combustor makes it particularly well suited to fuels with low Btu value and high moisture characteristics.

Combustor 72 operates on fuels as diverse as agricultural waste, municipal solid waste, wood wastes, plastic, tires and coal. Fluid bed systems are also capable of efficiently combusting fuels of curing consistency. Emissions from a fluid bed unit are inherently lower than conventional technologies for the following reasons:

Low combustion temperatures and low excess air with in the bed reduce the formation of certain emissions such as NO.

High combustion efficiency results in flue gasses that contain low amounts of CO.

Emissions such as SO and No may be abated within the fluid bed system by injecting limestone into the bed and ammonia into the vapor space.

The high combustion efficiency of a fluid bed results in a reduced amount of inorganic material as fine ash. The remaining larger material consists mainly of non-combustibles, such as rocks and wire brought in with the fuel, and coarse sane-like neutral particles. Low combustion temperatures in the fluid bed minimize the formation of toxic materials that might go into the ash. Ash samples from the systems have consistently tested nontoxic, and in many instances the ash is being sold as input for other products such as cement.

Combustor 72 has the ability to operate under a wide and varying load conditions. The thermal "fly-wheel" effect of the bed material allows swings in moisture and heating content of the fuel to be absorbed by the system without negative impact. Conversely, the low fuel inventory present in the unit makes it very responsive to varying loads. The fluid bed also maintains efficiency during system turn-down.

The lack of moving parts in a fluid bed reduces maintenance costs and down time. The units have achieved operating availabilities above 98 percent and have kept operating costs relatively low given the difficult fuel they are burning.

The digested solids materials are dewatered by augers and introduced into a curing structure 73. The solid materials are placed in windrows in structure 73 which are periodically turned over with a compost turning machine. Air is supplied to each windrow of material from a bio-filter 74 into curing structure 73. Gases from curing structure 73 are recirculated through tubular members 77 from curing structure 73 back to bio-filter 74. Additional air and water are added to the windrowed materials each time the materials are turned over. Automatic temperature controls and moisture content of the materials are periodically checked to ensure optimum material curing conditions.

When the materials in curing structure 73 reach maturity they are moved to a screening machine 78 which removes glass, plastic, rocks, and large items from the materials. The screening machine can be a rotary drum screening machine or a vibrating screening machine. A destoner 79 removes additional foreign objects from the compost material. The final cured compost 81 is transported or conveyed to a location having bulk material handling and bagging equipment used to package cured compost material.

From the foregoing detailed description of the recent invention it has been shown how the objects of the invention have been obtained in preferred manners. However, modifications and equivalents of the disclosed structures and methods such as those which occur to those skilled in the art, are intended to be included within the scope of this invention. The invention is intended to be limited only by the claims which are, or which may hereafter be, appended hereto.

What is claimed is:

1. A method of separating waste materials including soil, fine particulates, organic materials, paper, cardboard, wood, plastics, and glass comprising:

depositing the waste materials in a material receiving area, moving the waste materials from the material receiving area to a first location, removing cardboard and plastic from the waste materials in a first location and placing the cardboard and plastics in separated locations, moving the remaining waste materials in the first location to a second location, separating soil, fine particulates, and organic materials from the waste materials in the second location, moving the separated soil, fine particulates, and organic materials from the second location to location for further processing, depositing bulk materials from the second location on a conveyor operable to move the bulk materials in an elongated path, removing paper, wood, and plastic from the conveyor and placing paper, wood and plastics in separated locations, moving the remaining bulk materials to a blast proof enclosure, shredding the remaining bulk materials within the blast proof enclosure to reduce the size of the remaining bulk materials, moving the shredded bulk materials out of the enclosure, adding water to the shredded bulk materials, compressing the shredded bulk materials into pellets, and moving the pellets to a collection location.

2. The method of claim 1 including: removing hazardous objects and materials from the waste materials after the waste materials have been deposited in the material receiving area.

3. The method of claim 1 wherein: the cardboard and plastics are manually removed from the first location.

4. The method of claim 1 including: baling the cardboard and plastics that were removed from the waste materials in the first location.

5. The method of claim 1 wherein: the soil, fine particulates, and organic materials are separated from the waste materials in the second location with a rotating cylindrical screen drum.

6. The method of claim 1 including: composting the separated soil, fine particulates and organic materials.

7. The method of claim 6 including: mixing the separated soil, fine particulates and organic materials and adding water thereto prior to composting thereof.

8. The method of claim 1 including: mixing the separated soil, fine particulates and organic material, anaerobic digesting the mixed soil, fine particulates and organic material, and curing the digested soil, fine particulates and organic materials to produce useable compost.

9. The method of claim 8 including: screening the cured soil, fine particulates and organic materials to remove glass and large objects from the materials.

10. The method of claim 1 including: removing non-ferrous and ferrous metals from the soil, fine particulates, and organic materials as they move from the second location for further processing.

11. The method of claim 1 including: removing non-ferrous and ferrous metals from the bulk materials prior to shredding of the bulk materials.

12. A method of separating waste materials including soil, fine particulates, organic materials, paper, cardboard, wood, plastics, and glass comprising:

depositing the waste materials in a material receiving area, moving the waste materials from the material receiving area to a first location, removing cardboard and plastic from the waste materials in the first location and placing the cardboard and plastics in separated locations, moving the remaining waste materials in the first location to a second location, separating soil, fine particulates, and organic materials from the waste materials in the second location, moving the separated soil, fine particulates, and organic materials from the second location to location for further processing, depositing bulk materials from the second location on a conveyor operable to move the bulk materials in an elongated path, removing paper, wood, and plastic from the conveyor and placing paper, wood and plastics in separated locations, shredding the remaining bulk materials received from the conveyor to reduce the size of the remaining bulk materials, adding water to the shredded bulk materials, compressing the shredded bulk materials into pellets, and moving the pellets to a collection location.

13. A method of separating waste materials including fine materials and bulk materials, said bulk materials including cardboard and plastic comprising:

depositing the waste materials in a materials receiving area, transporting the waste materials from the materials receiving area to a first location, removing cardboard and plastic from the bulk materials in the first location and placing the cardboard and plastic in separated locations, moving the remaining waste materials in the first location to a second location, separating fine materials from the remaining bulk materials in the second location, transporting the separated fine materials from the second location to location for further processing, transporting remaining bulk materials from the second location to a blast proof enclosure, shredding all remaining bulk materials within the blast proof enclosure to reduce the size of the remaining bulk materials, moving the shredded bulk materials out of the enclosure, adding water to the shredded bulk materials, compressing the shredded bulk materials into pellets, and moving the pellets to a collection location.

14. The method of claim 13 including: removing hazardous objects and materials from the waste materials after the waste materials have been deposited in the material receiving area.

15. The method of claim 13 wherein: the bulk materials are manually removed from the first location.

16. The method of claim 13 wherein: the fine materials are separated from the waste materials in the second location with a rotating cylindrical screen drum.

17. The method of claim 13 including: composting the separated fine materials.

18. The method of claim 17 including: mixing the separated fine materials and adding water thereto prior to composting thereof.

19. The method of claim 13 including: mixing the separated fine materials, anaerobic digesting the mixed fine materials, and curing the digested fine materials to produce useable compost.

20. The method of claim 19 including: screening the cured fine materials to remove glass and large objects from the materials.

21. The method of claim 13 including: removing non-ferrous and ferrous metals from the fine materials as they are transported from the second location for further processing.

22. The method of claim 13 including: removing non-ferrous and ferrous metals from the bulk materials prior to shredding of the bulk materials.

23. A method of separating waste materials including fine materials and bulk materials comprising:

depositing the waste materials in a material receiving area, transporting the waste materials from the material receiving area to a first location, separating bulk materials from fine materials, transporting the separated fine materials to a location for further processing, transporting the bulk materials to a location for shredding the bulk materials, shredding the bulk materials to reduce the size of the bulk materials, adding water to the shredded bulk materials, compressing the shredded bulk materials into pellets, and moving the pellets to a collection location.

24. An apparatus for separating fine and bulk waste materials comprising: first means for receiving fine and bulk waste materials and transporting the materials to a first location, second means for moving the materials in the first location along a first elongated path to allow bulk waste materials to be separated from the waste materials moving along the first elongated path, screen means receiving the waste materials from the second means and separating the fine waste materials from the waste materials, means for mixing the fine waste materials separated by the screen means prior to processing of the fine waste materials, third means for receiving waste materials from the screen means and moving the waste material in second elongated path to allow additional bulk waste materials to be separated from the waste materials moving in the second elongated path, shredded means for receiving waste materials from the third means and reducing the particle size of the waste materials, an enclosure surrounding the shredder means to isolate the environment around the shredder means from explosions and fires, means for adding water to the shredded waste materials, and means for receiving shredded waste materials from the shredder means and for compressing the shredded waste materials and water added thereto into pellets, and fourth means for transporting the pellets to a pellet receiving location.

25. The apparatus of claim 24 wherein: the screen means is a trommel screen having a cylindrical screen drum, and means for rotating the drum.

26. The apparatus of claim 24 including: a magnetic separator for removing ferrous metal from the waste material and an eddy current separator for removing non-ferrous metal from the waste material.

27. The apparatus of claim 24 including: means for collecting dust and airborne particles generated by the shredder means prior to compressing the shredded waste materials into pellets.

28. The apparatus of claim 24 including: a digester for receiving mixed fine waste materials and anaerobic digesting the fine waste materials which produce methane gas, curing means for accommodating the digested solid materials from the digester, and screening means for the cured digested solid materials to remove large objects from the materials.

29. An apparatus for separating fine and bulk waste materials comprising: first means for receiving fine and bulk waste materials and transporting the materials to a first location, second means for moving the materials in the first location along a first elongated path to allow bulk waste materials to be separated from the waste materials moving along the first elongated path, screen means receiving the waste material from the second means and separating the fine waste materials from the waste material, means for mixing the fine waste materials separated by the screen means prior to processing of the fine waste materials, third means for receiving waste materials from the screen means and moving the waste materials in second elongated path to allow bulk waste materials to be separated from the waste materials moving in the second elongated path, shredder means for receiving waste materials from the third means and reducing the particle size of the waste materials, means for adding water to the shredded waste materials, and means for receiving shredded waste materials from the shredder means and for compressing the shredder waste materials and water added thereto into pellets, and fourth means for transporting the pellets to a pellet receiving location.

30. The apparatus of claim 29 including: means for collecting dust and airborne particles generated by the shredder means prior to adding water to the shredded waste materials and compressing the shredded waste materials into pellets.

* * * * *